United States Patent [19]
Hoffmann

[11] Patent Number: 4,911,043
[45] Date of Patent: Mar. 27, 1990

[54] APPARATUS AND METHOD FOR MILLING A TROCHOIDAL ROTOR

[75] Inventor: Ralph M. Hoffmann, Eden Prairie, Minn.

[73] Assignee: Compression Technologies, Inc., Eden Prairie, Minn.

[21] Appl. No.: 325,089

[22] Filed: Mar. 14, 1989

Related U.S. Application Data

[63] Continuation of Ser. No. 112,623, Oct. 26, 1987, abandoned.

[51] Int. Cl.[4] .......................... B23B 5/24; B23B 41/04
[52] U.S. Cl. .......................................... 82/18; 82/1.11; 409/132; 409/240
[58] Field of Search ............. 82/18, 40 R, 40 A, 1.11; 409/142, 132, 131, 199, 200, 240, 165, 166, 167, 169; 51/50 R, 50 PC, 43, 105 R, 105 EC, DIG. 32

[56] References Cited

U.S. PATENT DOCUMENTS

| 167,614 | 9/1875 | Koch et al. ............................... 82/18 |
| 3,343,305 | 9/1967 | Benford et al. ...................... 82/40 R |
| 3,593,603 | 7/1971 | Gellert ..................................... 82/18 |
| 3,805,454 | 4/1974 | Omonishi et al. ................. 51/105 R |
| 3,813,818 | 6/1974 | Hayashi et al. ................. 51/DIG. 32 |
| 3,867,868 | 2/1975 | Natkai et al. ................... 51/DIG. 32 |
| 4,395,206 | 7/1983 | Hoffmann ........................ 418/61 A |
| 4,400,145 | 8/1983 | Hoffmann ........................ 418/61 A |
| 4,551,083 | 11/1985 | Hoffmann ........................ 418/61 A |
| 4,638,694 | 1/1987 | Slee ......................................... 82/18 |

FOREIGN PATENT DOCUMENTS

| 549324 | 6/1977 | U.S.S.R. ........................ 51/DIG. 32 |
| 507833 | 1/1939 | United Kingdom . |
| 1419675 | 12/1975 | United Kingdom . |
| 1461513 | 1/1977 | United Kingdom . |
| 2162107 | 1/1986 | United Kingdom . |

OTHER PUBLICATIONS

F. J. Robinson et al., "Machining Trochoidal Profiles by Numerical Control", School of Engineering, Lakehead University, Thunder Bay, Ontario, Canada.

Primary Examiner—Neil Abrams
Attorney, Agent, or Firm—Hill, Van Santen, Steadman & Simpson

[57] ABSTRACT

A device and method for milling a trochoidal rotor having a predetermined trochoidal configuration. The trochoidal rotor is used in a trochoidal rotary device in which working chambers are defined between the rotor and a housing. The rotor device has inlet and outlet ports for passing a fluid or gas. The rotor is made by first planetating a rotor blank having a predetermined width and having an edge region about a predetermined axis. The cutting blade is provided which has a predetermined geometry and which is located at a predetermined fixed distance from the axis. The cutting blade is engaged with at least a portion of the edge region of the rotor blank. The cutting blade traverses the edge region of the rotor blank to cut the edge region into a predetermined trochoidal configuration. When the cutting blade is a helical flute, the engagement of the cutting blade with a portion of the edge region results in cutting at a predetermined location within the portion of the edge region. This cutting location continuously sweeps back and forth in an axial direction across the portion of the edge region as a rotor blank rotates.

18 Claims, 3 Drawing Sheets

APPARATUS AND METHOD FOR MILLING A TROCHOIDAL ROTOR

This is a continuation of application Ser. No. 112,623, filed 10/26/87, now abandoned.

BACKGROUND OF THE INVENTION

The present invention relates to a method and apparatus for milling a workpiece blank, the workpiece blank rotating in a non-circular manner, and, in particular, for milling a trochoidal rotor.

Trochoidal rotary expansible chamber devices, such as the Wankel or epitrochoidal rotary machines, generally comprise a housing defining a cavity in which is mounted a rotor rotatable in a planetating fashion. Trochoidal rotary devices may be divided into two groups referred to as inner envelope and outer envelope types. In an inner envelope configuration, the profile of the housing cavity is the trochoidal curve and the peripheral profile of the rotor is the inner envelope of the trochoidal curve. In an outer envelope device, the rotor profile is the trochoidal curve and the housing cavity profile is the outer envelope of that curve. Variable spaces formed between facing peripheral surfaces of the rotor an housing cavity serve as working chambers for expansion engines, compressors, expanders, meters, etc. The working chambers are sealed with radially extending apex seals positioned along intersection lines between adjoining peripheral faces on the envelope curve surface.

As those skilled in the art will recognize, the terms "inner envelope" and "outer envelope" refer to the manner in which working member profiles are generated for trochoidal rotary expansible chamber devices. Typical forms of trochoidal devices have fixed housing members for containing rotors travelling in a planetating rotary fashion therein. The known forms have either inner rotors in the form of epitrochoid or hypotrochoid curves or they have inner rotors in the form of envelopes derived from those curves. The designations "epitrochoid" and "hypotrochoid" refer to the manner in which a trochoidal machine's profile curves are generated as described in the Bonavera U.S. Pat. No. 3,117,561.

The manner in which trochoidal curves are formed is well-known in the art. The instant invention applies to all forms of rotary trochoidal machines; however, for purposes of illustration, the invention will be described with reference to epitrochoidal-type machines.

One way to form an epitrochoidal curve is by first selecting a base circle and a generating circle having a diameter greater than that of the base circle. The base circle is placed within the generating circle so that the generating circle is able to roll along on the circumference of the base circle. A curve which is a parallel expansion or a parallel contraction of the epitrochoid is a locus of points, which are equal distance from and normal to the locus of points forming the epitrochoid. The distance between said curves is commonly called seal radius "SR". Curves which are a parallel contraction or expansion of a trochoid or an epitrochoid are commonly referred to as a trochoid or epitrochoid respectively. The distance between the centers of the base and generating circles is conventionally referred to as the eccentricity "e" of the epitrochoidal machine. The epitrochoidal curve is defined by the locus of points traced by the tip of the radially extending generating or drawing arm, fixed to the generating circle and having its inner end pinned to the generating circle center, as the generating circle is rolled about the circumference of the base circle which is fixed. The envelopes are generated by holding the generating circuit stationary and rolling the base circle, carrying the epitrochoid curve with it, about the interior circumference of the generating circle. The inner envelope is the inner outline of the path made by the moving epitrochoid; and the outer envelope is the outer outline of this path. In a typical "inner envelope" epitrochoidal device, the rotor is defined by the envelope profile and rotates in the relationship of the generating circle rolling around the base circle. In an "outer envelope" epitrochoidal device, the rotor is defined by the epitrochoidal curve profile such as that the rotor rotates in the relationship of the base circle rolling around the generating circle.

As is well known in the art of trochoidal devices having a trochoidal rotor of an epitrochoid type, the epitrochoidal configuration is defined by certain mathematical relationships. As described above in the epitrochoid is produced by rolling a generating circle having a radius r around a base circle having a radius r. The term, R, is then defined as the distance from the center of the rolling circle t the tip of the radially extending generating or drawing arm.

Given these fundamental proportions of an epitrochoid a factor K, is defined as $K = R/e$ and an angle of obliquity or leaning angle, $\phi$, is derived from the relationship $$\sin \phi = \frac{Ze}{R}$$

where Z is the number of lobes on the envelope or the number of apexes.

One skilled in the art can now derive the mathematical equations which define each point on an epitrochoid with reference to a selected coordinate system. These equations can then be utilized in cutting or forming a trochoidal rotor from a rotor blank workpiece.

Prior art methods and devices for milling trochoidal rotors are expensive and complex. The epitrochoidal configuration of the rotor requires a milling machine having a high degree of precision. One procedure known in the prior art is to utilize a numerically controlled vertical milling machine for milling the rotor, such as a Gorton Tapemaster Type 2-30 vertical milling machine fitted with a Bunker Ramo Model 3100 three axis numerical control system. Control is provided for the milling table, cross slide and knee elements of the machine tool by means of hydraulic position servo mechanisms driving ball screws. Position feed-back signals are derived from pulse generators mounted on each of the ball screws which feed incremental counters in the control console. A single positioned read-out panel is provided on the console which may be switched to read in any axis.

Although classed as a continuous path machine, it is in fact a digital incremental point-to-point unit with on-line computing facilities which provide circular arc and mirror image machining capability. The incremental position feed-back system enable the machine to be zeroed at any point within its operating range, thereby facilitating setting up procedures.

Programs are prepared on punched paper tape which are derived from computer software, such as APT (Automatically Programmed Tool). The APT program allows the mathematical equations for the article to be milled to be inputted into a computer containing the APT program. The program then produces the punched paper tape for use by the numerical control system on the milling machine. Producing rotors utilizing this prior art method and apparatus is both time consuming and expensive.

The present invention overcomes these drawbacks of CNC machining methods, including those typically illustrated by the above, although these are not necessarily the most current. The present invention provides an effective, economical and simple method and device for milling trochoidal rotors.

SUMMARY OF THE INVENTION

The present invention involves a method and apparatus for milling a trochoidal rotor. The trochoidal rotor has a predetermined trochoidal configuration and is used in a trochoidal rotary device in which working chambers are defined between the rotor and the housing. The rotary device also has appropriate inlet and outlet ports for passing fluid or gas. The rotor is made by first planetating about a rotor blank having a predetermined width and having an edge region. A cutting blade having a predetermined geometry is provided and is located at a predetermined fixed radius from the axis. The cutting blade is engaged with at least a portion of the edge region of the rotor blade and traverses the edge region of the rotor blank to cut the edge region into the predetermined trochoidal configuration.

Furthermore, the rotor blank and the cutting blade are orientated in parallel axial alignment and either the rotor blank or the cutting blade is moved in an axial direction in order to traverse the edge region of the rotor blank. The geometry of the cutting blade is in the form of a helical flute. As a result of engaging the cutting blade with the portion of the edge region, cutting at a predetermined location within the portion of the edge region occurs and the predetermined location of cutting is continuously swept back and forth in an axial direction across the portion of the edge region as the rotor blank rotates. In a preferred embodiment, the resulting trochoidal configuration for the rotor is an epitrochoid. The geometry of the cutting blade has a helical flute with the same radius as the radius of the apex seal which will be used in the ultimate assembly with the rotor.

BRIEF DESCRIPTION OF THE DRAWINGS

The features of the present invention which are believed to be novel, are set forth with particularly in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Whereas the invention has general applicability, such as for use in cutting a predetermined configuration into an edge region of a workpiece blank which is rotating in a non-circular manner, it is most advantageously utilized in the milling of a trochoidal rotor, especially a rotor having an epitrochoid configuration.

In general terms, a workpiece blank is rotated in a noncircular manner about a predetermined axis. A cutter having at least one cutting element with a predetermined geometry engages at least a portion of the edge region of the workpiece blank. The cutter is located at a predetermined fixed distance from the axis. The edge region of the workpiece blank is moved relative to the cutting element to cause the cutter to substantially traverse the width of the workpiece blank and to cause the cutting element to cut the edge region into the predetermined configuration. The rotating workpiece blank and the cutter are in parallel axial alignment. It is to be understood that the workpiece blank may be held in a constant position in an axial direction, while the cutter is moved in an axial direction, coaxially with the workpiece blank to perform the cutting, or vice versa. Preferably, the cutting element is in the form of a helical flute. The helical flute of the cutting element causes the cutting element to engage the portion of the edge region at a location of cutting which continuously sweeps back and forth in an axial direction across the portion of the edge region as the workpiece blank rotates.

Figure 1:
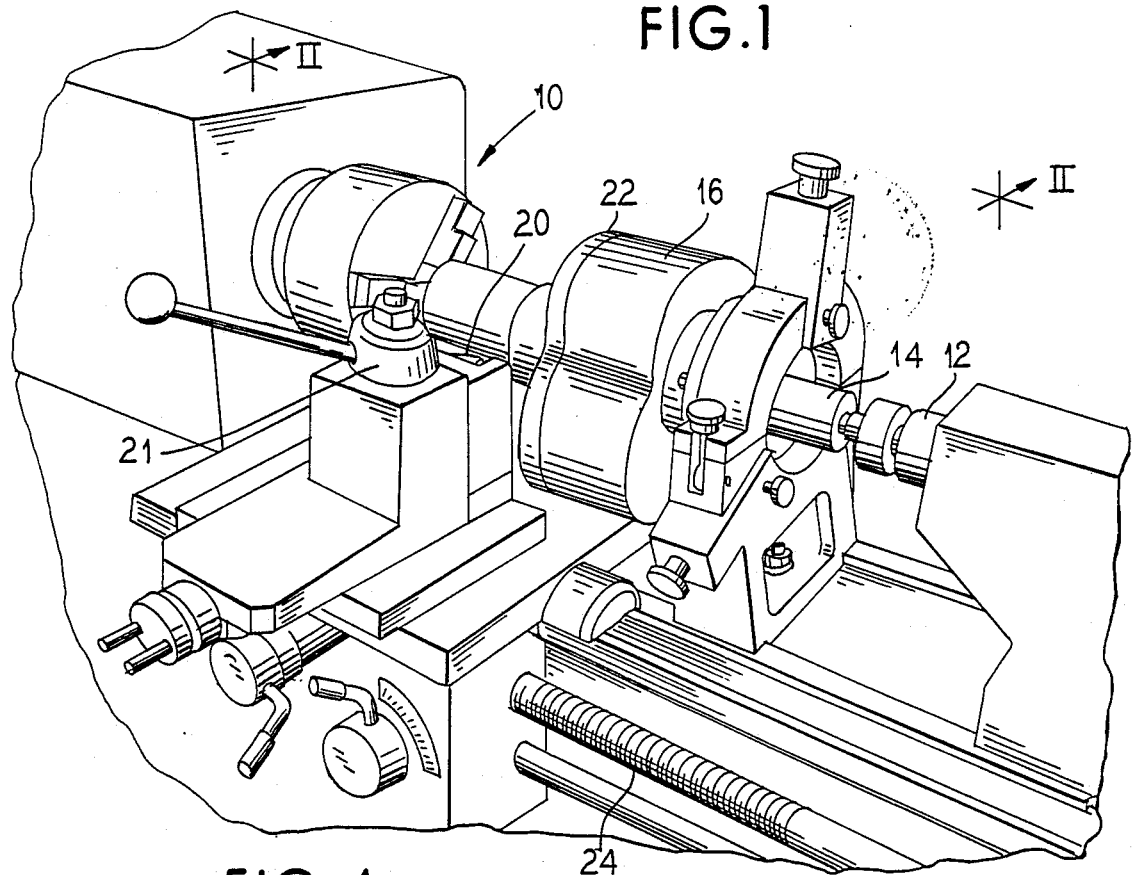
FIG. 1 is a perspective view of the milling device constructed and operating according to the present invention.

In a preferred embodiment as shown in FIG. 1, a lathe 10 has a concentric shaft 12 to which is attached an eccentric shaft 14. Mounted on the eccentric shaft 14 is a rotor blank 16.

Figure 2:
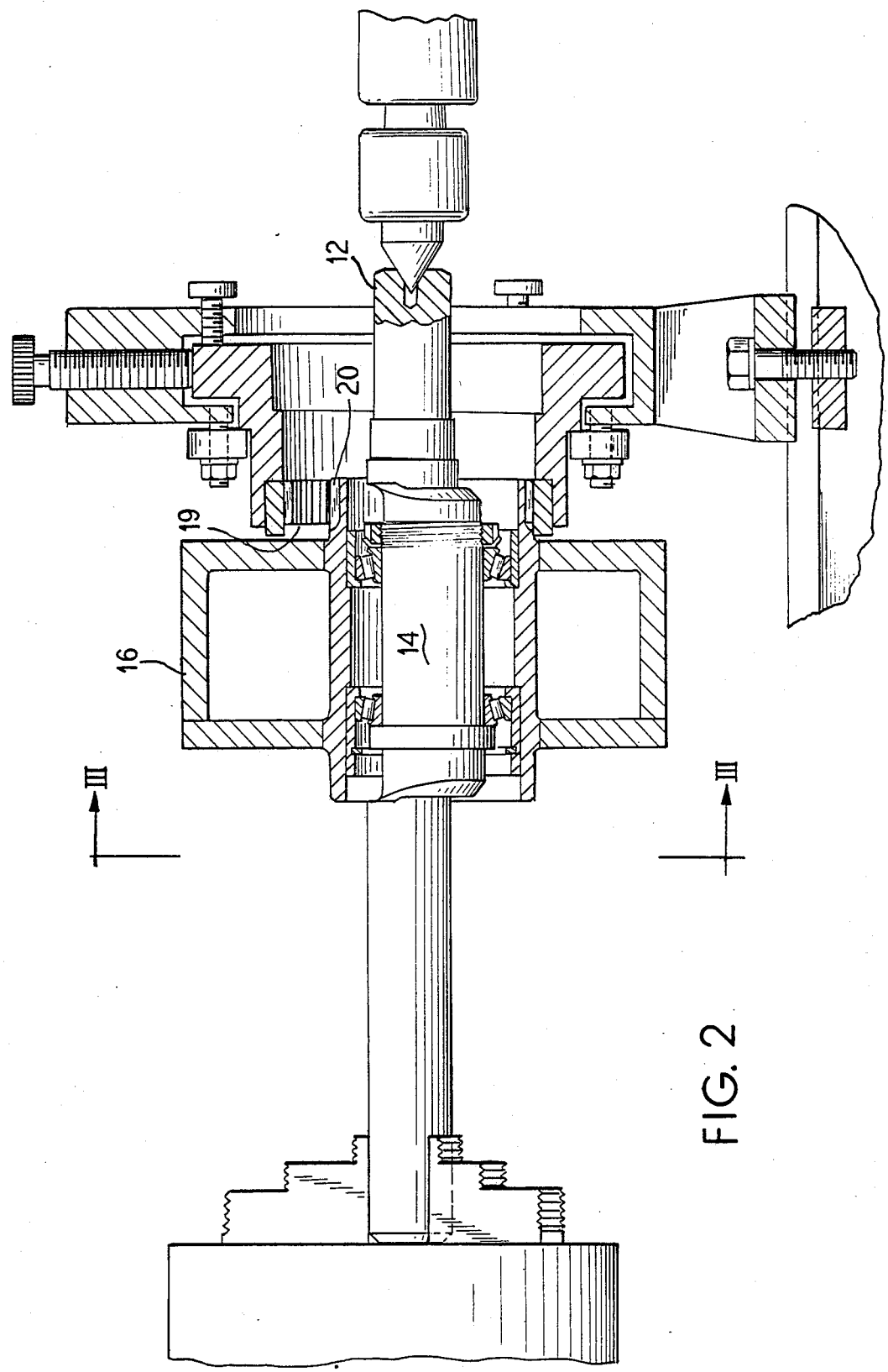
FIG. 2 is an axial cross-sectional view of the milling device showing the mounting of the trochoidal rotor blank on the milling device.
Figure 3:
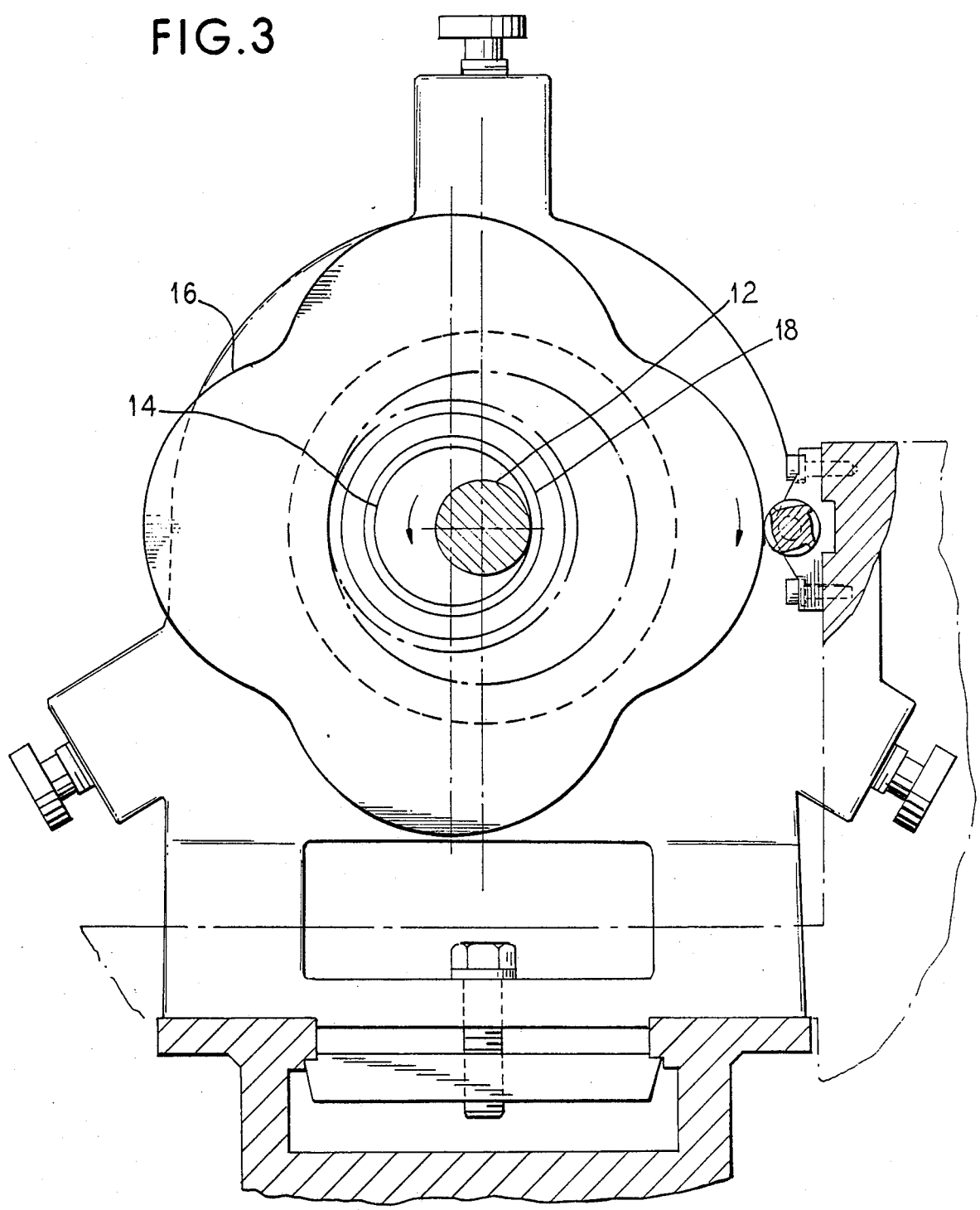
FIG. 3 is a radial cross-sectional view of the rotor blank on the milling device.

Referring also to FIGS. 2 and 3, a sleeve bearing 18 surrounds the eccentric shaft 14 and the rotor blank 16 is driven by the eccentric shaft 14 by appropriate timing gears 19 and 20 as is well known in the art. The attachment of the rotor blank 16 to the eccentric shaft 14 is identical to its attachment to a shaft in a trochoidal device thereby causing the rotor blank 16 to planetate in the same manner as it would in the trochoidal device. That is, it is to be understood that the movement of the rotor blank 16 corresponds to the shape of the ultimate trochoidal rotor utilized in the trochoidal device. Producing the planetating motion of a trochoidal rotor is well known in the art.

As can be seen in FIG. 1, the rotor blank is first formed substantially in the general trochoidal shape desired. However, it is to be understood that the cutting of the trochoidal shape could be achieved with starting even with a circular blank, however, it is obvious that it is more efficient to start with a trochoidal shape which is cast as closely as possible to the desired finished trochoidal configuration. A cutting element 20 is provided in an appropriate holder 21 and it engages at least a portion 22 of the rotor blank 16. Screw type shaft 24 is provided to allow the cutting element 20 to traverse the edge region of the rotor blank 16. In the preferred embodiment, the cutting element 20 is moved across the edge region of the rotor blank 16, however, it can also be envisioned that the lathe 20 is moved relative to a stationary cutting element 20. It is important to note that the cutting element 20 is located a fixed predetermined distance from the center axis of the lathe 20 and only moves in an axial direction.

Figure 4:
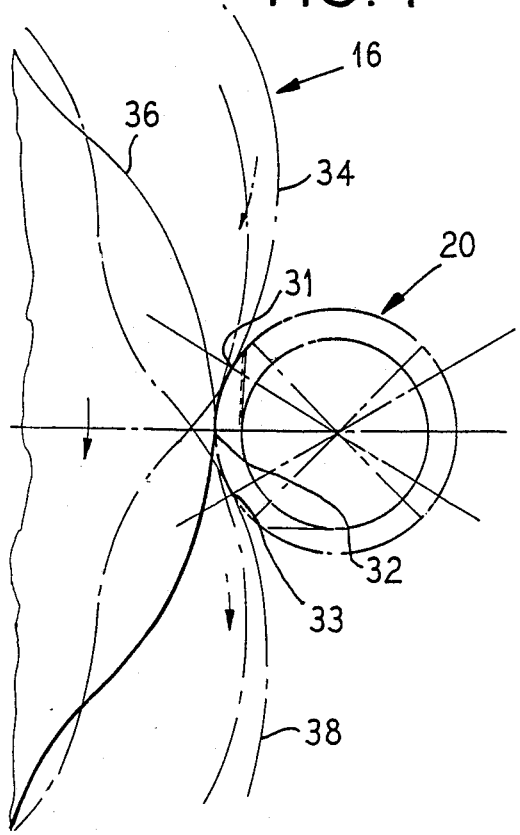
FIG. 4 is a schematic diagram illustrating the engagement of a cutting blade with the planetating rotor blank.
Figure 5:
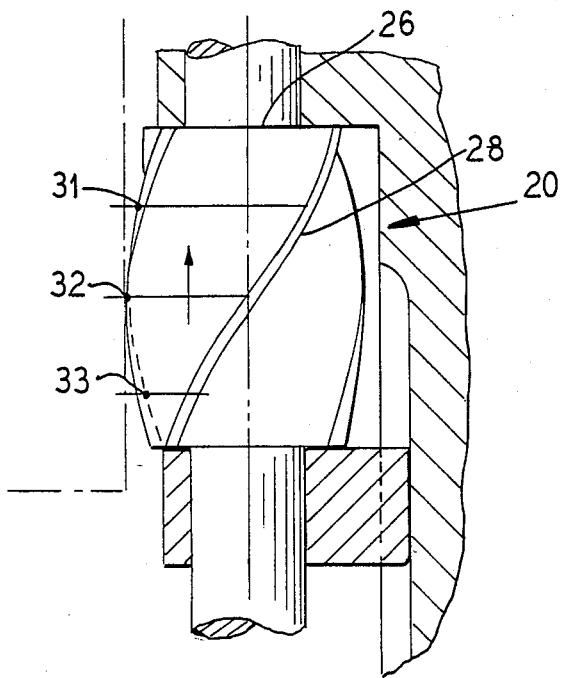
FIG. 5 is a side view of the cutting blade.

As can be seen in FIGS. 4 and 5, the cutting element 20 is preferably a barrel-shaped hub 26 which has a predetermined curvature and located on the hub 26 is at least one cutting blade 28 which is formed in the configuration of a helical flute. Preferably, the diameter of the helical flute is equal to twice the seal radius. As shown in the preferred embodiment there may be a plurality of cutting blades 28 formed on the hub 26 of the cutting element 20. It is to be understood, however, that the purpose of a plurality of cutting blades 28 is that when one of the blades 28 becomes dull the hub 26 may be rotated so that a new cutting blade 28 may be utilized. However, during the milling operation only one cutting blade 28 is utilized and the hub is locked into a stationary position.

Due to the helical flute form of the cutting blade 28 and due to the epitrochoid configuration which in the preferred embodiment is the desired configuration to be cut into the rotor edge, the actual cutting location within the portion 22 of the rotor edge moves from point 31 to point 32 and finally to point 33 and then back again to point 31 as the rotor blank 16 planetates. The reason for this is shown in FIG. 4. As one section 34 of the rotor blank 16 approaches the cutting blade 28, the cutting occurs at location 31. As the apice of a lobe 36 passes the cutting blade 28, the cutting occurs at point 32. Finally, as section 38 of the rotor blank passes the cutting blade 28, the cutting location takes place at point 33. Thus, it can be seen that by engaging the cutting blade 28 with the portion 22 of the edge region of the rotor blank 16, the cutting occurs at a predetermined location within the portion 22 of the edge region and continuously sweeps this cutting location back and forth in an axial direction across the portion 22 of the edge region as the rotor blank planetates. FIG. 4 shows that as a result of the planetating motion of the rotor blank, the rotor presents to the cutting element different attitudes depending upon the relationship of the rotor blank to the cutting element.

Excellent results in cutting an outside epitrochoid configuration into a rotor blank results when the helical flute or cutting blade 28 has an included angle, 40, which is equal to or exceeds two times the leaning angle of the particular trochoidal design. For example, if in a particular epitrochoid, the leaning angle is 30°, then the helical flute forming the cutting element 28 traverses 60° as shown in FIG. 4.

It can be appreciated that the method of the present invention can be utilized for cutting predetermined configurations into an edge region of a general workpiece blank, other than a trochoidal rotor. The method in general involves rotating the workpiece blank in a non-circular manner about a predetermine axis, providing a cutting element having a predetermined geometry, locating the cutting element for cutting at a predetermined fixed distance from the axis, engaging at least a portion of the edge region of the workpiece blank with the cutting element, and traversing the edge region of the workpiece blank with the cutting element to cut the edge region into the predetermined configuration. Furthermore, the workpiece blank and the cutting element are located in parallel axial alignment and either the workpiece blank or the cutting element is moved in an axial direction in order to traverse the edge region of the workpiece blank. Also, the cutting element may have a predetermined helical configuration. With such a helical configuration, when the cutting element is engaged with the portion of the edge region, cutting occurs at a predetermined location within the portion of the edge region and this cutting location continuously sweeps back and forth in an axial direction across the portion of the edge region as a workpiece blank rotates.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A device for milling a predetermined configuration into an edge region of a workpiece blank, said device comprising the following:
   means for rotating the workpiece blank in a non-circular manner about a predetermined axis;
   cutting means for removing the material from said workpiece blank during rotation thereof, said cutting means comprising at least one cutting edge having an axial length;
   wherein said at least one cutting edge engages said workpiece at a single point of contact; and
   wherein said at least one cutting edge comprises means for causing said point of contact to reciprocally traverse the axial length of said at least one cutting edge without axial movement of said cutting means or said workpiece blank.

2. The device described in claim 1, further including the following:
   means for moving said workpiece blank relative to said at least one cutting edge of said cutting means, to cause said cutting means to substantially traverse the width of the workpiece blank and to cause said at least one cutting edge to cut said workpiece blank into said predetermined configuration; and
   wherein said means for rotating and said cutting means are in parallel axial alignment and said means for moving is capable of moving either said means for rotating or said cutting means in an axial direction.

3. The device described in claim 2, further wherein said at least one cutting edge is convexly bowed, along its axial length, with respect to said workpiece blank.

4. The device of claim 3, further wherein said at least one cutting edge comprises a plurality of cutting edges arranged as helical flutes around a barrel-shaped hub.

5. The device described in claim 4, further wherein each of said cutting edges traverses an arc on the circumference of said hub that is equal to or greater than two times a leaning angle of said predetermined configuration.

6. The device described in claim 1, wherein said cutting means has a diameter equal to twice a seal radius of said predetermined configuration.

7. The device described in claim 6, further wherein said predetermined configuration is a trochoidal configuration.

8. The device described in claim 7, further wherein said predetermined trochoidal configuration is an epitrochoid.

9. The device described in claim 1, further wherein said workpiece blank is a trochoidal rotor, and said means for rotating planetates said workpiece blank with respect to said predetermined axis.

10. A method of milling a predetermined configuration into an edge region of a workpiece blank, said method comprising the following steps:
  rotating the workpiece blank in a non-circular manner about a predetermined axis;
  providing cutting means for removing the material from said workpiece blank during rotation thereof, said cutting means comprising at least cutting edge having an axial length;
  wherein said at least one cutting edge engages said workpiece at a single point of contact; and
  causing said point of contact to reciprocally traverse the axial length of said at least one cutting edge without axial movement of said cutting means or said workpiece blank.

11. The method described in claim 10, further including the following:
  moving said workpiece blank relative to said at least one cutting edge of said cutting means, to cause said cutting means to substantially traverse the width of the workpiece blank and to cause said at least one cutting edge to cut said workpiece blank into said predetermined configuration; and
  wherein said predetermined axis and said cutting means are in parallel axial alignment, either said workpiece blank or said cutting means is moved in an axial direction.

12. The method described in claim 11, further comprising the step of providing said at least one cutting edge so that it is convexly bowed, along its axial length, with respect to said workpiece blank.

13. The method of claim 12, further comprising the step of providing at least one cutting edge as a plurality of cutting edges arranged as helical flutes around a barrel-shaped hub.

14. The method described in claim 13, further comprising the step of providing each of said cutting edges so that it traverses an arc on the circumference of said hub that is equal to or greater than two times a leaning angle of said predetermined configuration.

15. The method described in claim 10, further comprising the step of providing said cutting means so that it has a diameter equal to twice a seal radius of said predetermined configuration.

16. The method described in claim 14, further wherein said predetermined configuration is a trochoidal configuration.

17. The device described in claim 16, further wherein said predetermined trochoidal configuration is an epitrochoid.

18. The method described in claim 10, further comprising the following steps:
  providing said workpiece blank as a trochoidal rotor; and
  wherein said step of rotating the workpiece blank includes planetating said workpiece blank with respect to said predetermined axis.

* * * * *